United States Patent
Sugiura et al.

[11] Patent Number: 6,031,667
[45] Date of Patent: Feb. 29, 2000

[54] OPTICAL PICKUP DEVICE

[75] Inventors: Satoshi Sugiura; Akihiro Tachibana; Yoshihisa Kubota, all of Tsurugashima, Japan

[73] Assignee: Pioneer Electronic Corporation, Tokyo, Japan

[21] Appl. No.: 09/035,444

[22] Filed: Mar. 5, 1998

[30] Foreign Application Priority Data

Mar. 19, 1997 [JP] Japan ..................................... 9-066952

[51] Int. Cl.⁷ ........................... G02B 27/10; G02B 27/30; G11B 7/00
[52] U.S. Cl. ........................... 359/618; 359/641; 369/112
[58] Field of Search ..................................... 359/618, 641, 359/10, 12, 28, 719; 369/112, 44.23

[56] References Cited

U.S. PATENT DOCUMENTS 5,151,889  9/1992  Saimi et al. .......................... 369/44.37

OTHER PUBLICATIONS

Japanese Patent Application No. 5–328230 filed Dec. 24, 1993, Kokai No. 7–98431, Apr. 11, 1995, Matsusita Electric Industrial Co., Ltd.

*Primary Examiner*—Georgia Epps
*Assistant Examiner*—Michael A Lucas
*Attorney, Agent, or Firm*—Perman & Green, LLP

[57] ABSTRACT

Disclosed is an optical pickup device which comprises a beam emitting system for supplying at least two independent light beams, a common light converging optical system for converging the light beams from the beam emitting system toward a recording medium, a first optical element for reflecting one of the light beams from the beam emitting system so as to guide the reflected light beam to the light converging optical system and for transmitting returning light beams from the recording medium therethrough without causing substantial aberration, a second optical element for causing astigmatic aberration to the returned light beams which pass through the first optical element, while transmitting the returning light beams therethrough, and a light receiving system for receiving the returning light beams which have passed through the second optical element.

11 Claims, 5 Drawing Sheets

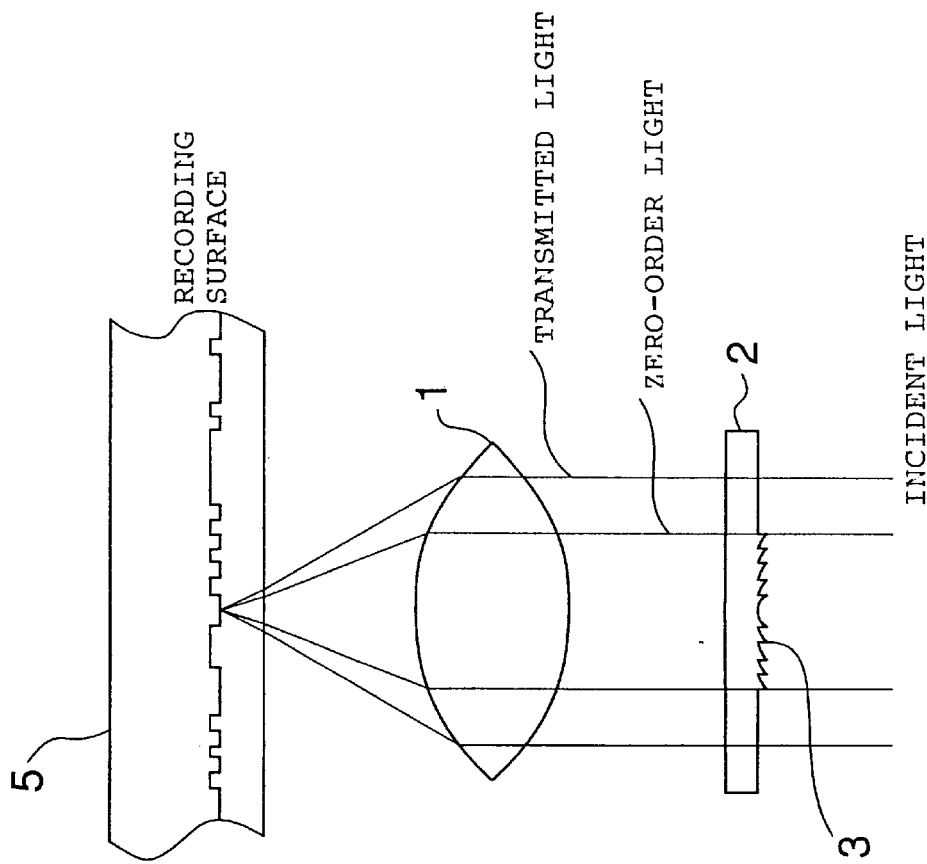
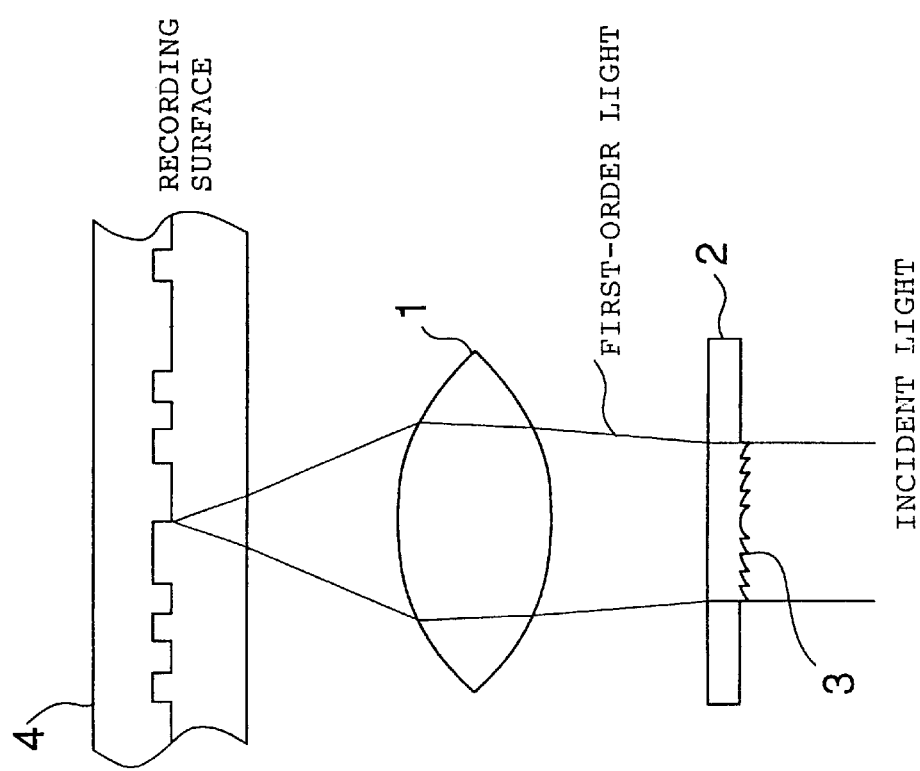

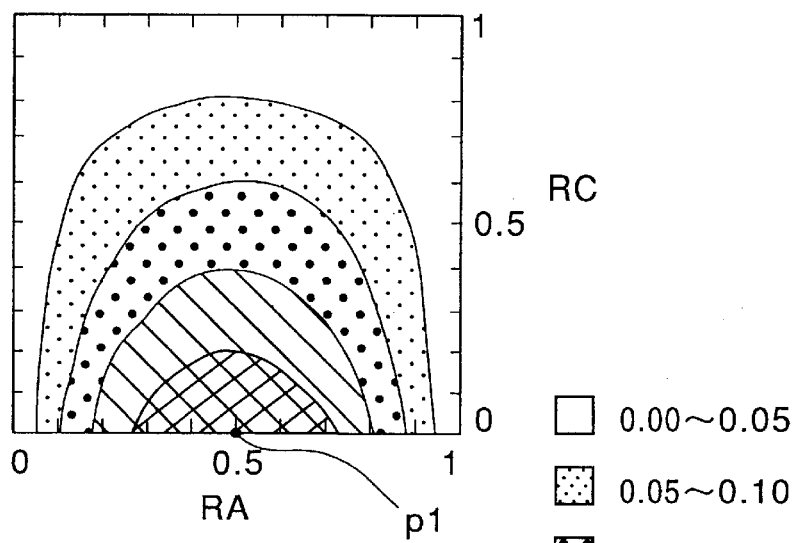
FIG. 5A
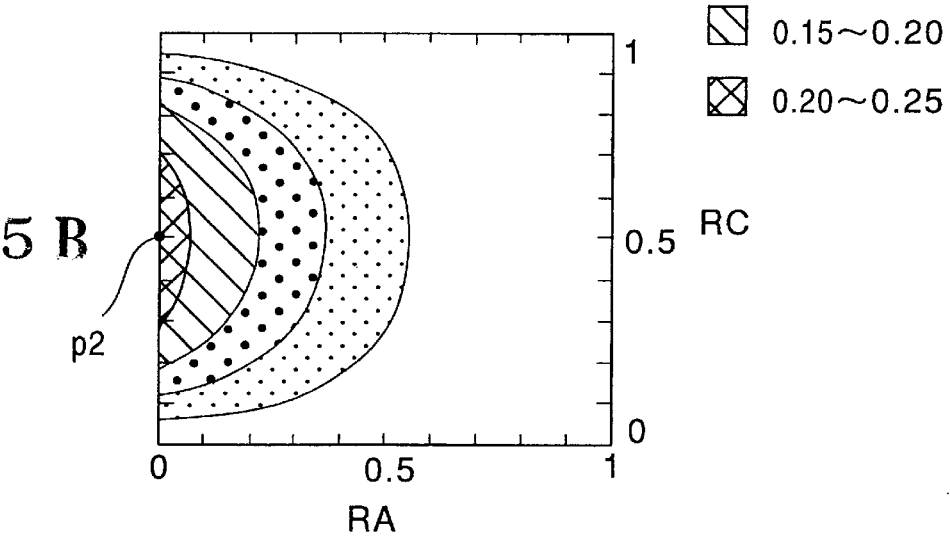
FIG. 5B
FIG. 5C
|  | | LD1 | LD2 |
|---|---|---|---|
| OPTIMUM VALUE | RA | 0.5 | 0.0 |
| | RC | 0.0 | 0.5 |

OPTICAL PICKUP DEVICE

BACKGROUND OF THE INVENTION

1. Field of the Invention

The present invention relates to an optical pickup device or an optical head device.

2. Description of Related Art

As optical information recording mediums, various kinds of optical disks, called Laser Disk (LD), Compact Disk (CD) and Digital Video Disc (DVD), have been known. In such optical disks, standardizations are made for the respective items such as thickness of the substrate in different specifications. Moreover, in optical disks of multi-layered structure included in a DVD specification, an effective thickness of the optical disk is different between the recording layers. The most suitable numerical aperture (NA) of a reading objective lens is differently determined among the different optical disks.

Compatible players capable of reading out recording information from, for example, both CD and DVD are required. There are the following differences between optical systems for reading out the recorded information on the CD and the DVD.

(1) Difference in the numerical apertures NA: the numerical aperture for the CD is set to be 0.45, while the numerical aperture for the DVD is set to be 0.6.

(2) Difference in the substrate thicknesses each from a recording surface (reflection surface) to an optical disk surface: the substrate thickness for the CD is set to be 1.2 mm, while 0.6 mm for the DVD.

(3) Difference in wavelengths of optimal reading-out lights: the wavelength thereof for the CD is set to be 780 nm, while 650 nm for the DVD.

Consequently, these differences must be overcome so as to realize an optical pickup device for the CD/DVD compatible player.

To achieve such compatible players, it is often thought that an objective lens having two focal points should advantageously be employed. This is because an objective lens having a single focal point has a numerical aperture most suitable for one optical disk, the numerical aperture being improper for the other optical disk. For the other optical disk, such objective lens produces an aberration such as a spherical aberration.

An example in which the two focal point pickup is realized using a hologram lens has been disclosed in Japanese Patent Application Kokai No. 7-98431/1995. This two focal point pickup forms a complex objective lens composed of an objective lens 1 and a hologram lens 2, as shown in FIGS. 1A and 1B. On the hologram 2, a plurality of diffraction grooves 3 are concentrically formed over the region corresponding to the numerical aperture for the CD. A light beam is diffracted by these diffraction grooves 3, so that it is divided into a zero-order diffraction light and a first-order diffraction light. Thus, respective incident angles of them onto the objective lens 1 are made different, whereby each focal point is formed on corresponding one of recording surfaces of the optical disks. At this time, the light beam is allowed to transmit through the region where no diffraction groove 3 is formed, without being diffracted, and this transmitted light is converged by the objective lens 1 together with the zero-order diffraction light. As a result, the transmitted light, the zero-order diffraction light, and the first-order diffraction light will have different numerical apertures, respectively. As shown in FIG. 1A, the first-order diffraction light diffracted by the diffraction grooves 3 is employed for reading a CD 4 of a small numerical aperture. As shown in FIG. 1B, the transmitted light and zero-order diffraction light of larger numerical aperture are employed for reading a DVD 5.

The structure principally involves the formation of reading spots with a single light source. A light source emitting a reading light of a wavelength of 650 nm, which is most suitable for the DVD, is normally used. However, a light most suitable for reading out a recordable/reproducible recording medium has a wavelength of 780 nm, which is called a CD-R (CD Recordable or a R-CD: Recordable CD) belonging to the CD group. Namely, the light having the wavelength as great as 650 nm is not suitable for reading out information recorded on the CD-R. Therefore, in order to realize a compatible player capable of performing a good recording/reproducing of information for a disk such as the CD-R, the optical pickup or head is preferably constructed with light sources of a plurality of wavelengths but not a single light source, each light source being suitable for corresponding one of the disks. However, such an optical system composed of a plurality of light sources typically has the disadvantage that the structure of the optical pickup or the whole head tends to be complicated and thus be larger in size.

OBJECT AND SUMMARY OF THE INVENTION

Accordingly, the present invention is made in view of the above points. It is an object of the present invention to provide an optical pickup or an optical head which is capable of excellently irradiating a plurality of independent light beams and receiving returned lights of them with a simple structure.

According to the present invention, there is provided an optical pickup device which comprises: beam emitting means for supplying at least two independent light beams; a common light converging optical system for converging the light beams from the beam emitting means toward a recording medium; a first optical element for reflecting one of the light beams from the beam emitting means so as to guide the reflected light beam to the light converging optical system and for transmitting returned light beams from the recording medium therethrough without causing substantial aberration; a second optical element for causing an astigmatic aberration to the returned light beams which pass through the first optical element to transmit the returned light beams therethrough; and light receiving means for receiving the returned light beams which have passed through the second optical element.

The second optical element may reflect the other light beam emitted from the beam emitting means so as to guide the reflected light beam to the first optical element, and the first optical element may transmit the light beam emitted from the second optical element without causing substantial aberration. Furthermore, the light converging optical system, the first optical element, the second optical element and the light receiving means may be subsequently arranged in this order from a surface to be read or recorded. Preferably, the first and second optical elements have optical characteristics which are determined so that an intensity of light received by the light receiving means may be approximately maximum in each of the light beams from the beam emitting means. A wedge-type beam splitter may be employed as the first optical element. A plane-parallel plate beam splitter may be employed as the second optical element.

BRIEF DESCRIPTION OF THE DRAWINGS

For a more complete understanding of the present invention and the advantages thereof, reference is now made to the following description taken in conjunction with the accompanying drawings.

FIGS. 1A and 1B partially show the structure of a conventional optical pickup device using a single light source/two focal point lens system.

FIGS. 5A–5C are graphs showing a distribution of light intensity on a light receiving element for describing a selection mode of optical characteristics on each surface of each beam splitter shown in FIG. 2 and a table showing summarized optimal values, respectively.

DETAILED DESCRIPTION OF THE PREFERRED EMBODIMENTS

An embodiment of the present invention will be described below in detail with reference to the accompanying drawings.

Figure 2:
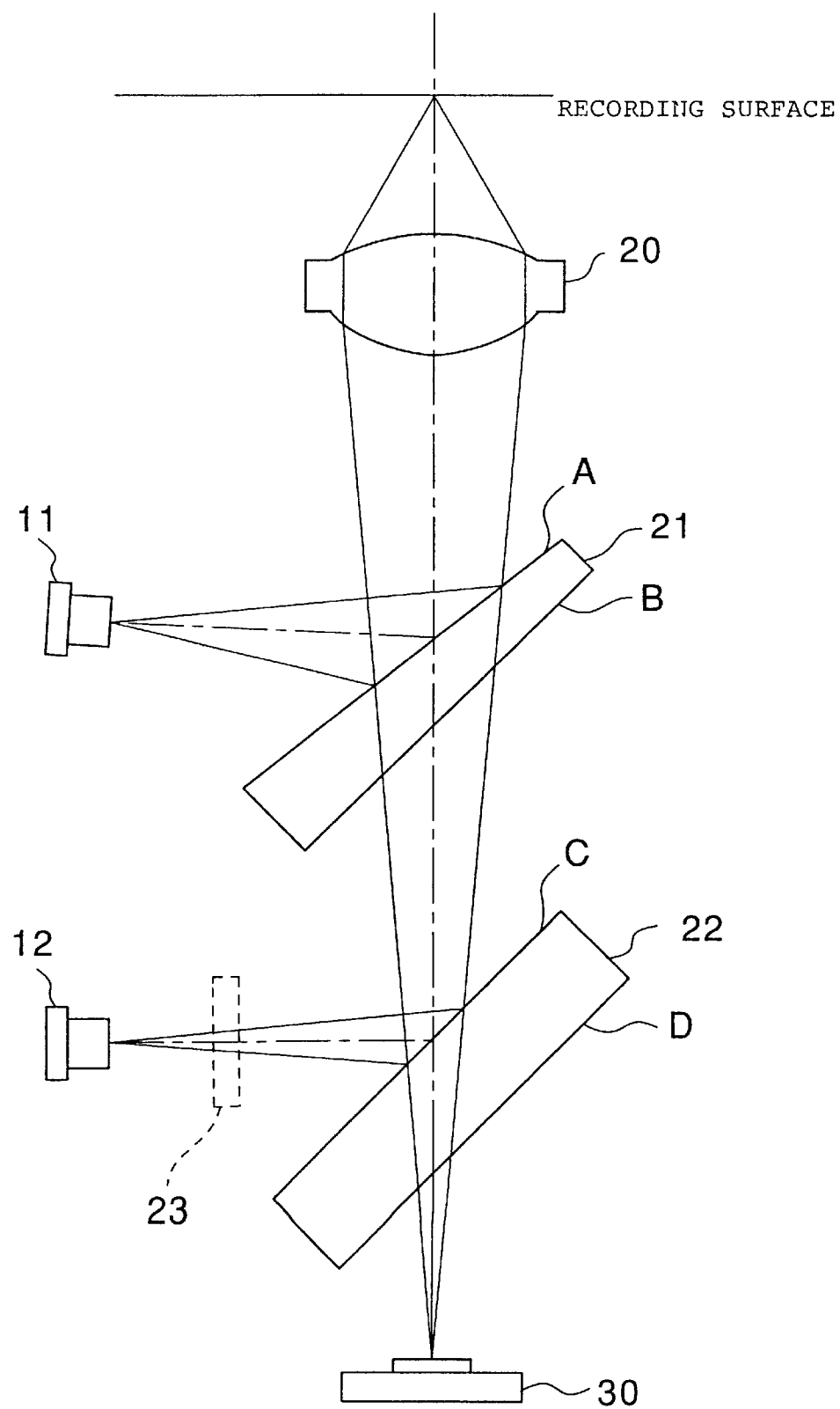
FIG. 2 schematically shows the main structure of an optical head device of an embodiment according to the present invention.

FIG. 2 shows a schematic structure of an optical head device of an embodiment according to the present invention. In FIG. 2, the optical head device or optical pickup device comprises a first laser diode (LD1) 11 for emitting a light beam having a wavelength of, for example, 650 nm suitable for reading a DVD and a second laser diode (LD2) 12 for emitting a light beam having a wavelength of, for example, 780 nm suitable for reading a CD and a CD-R. On the other hand, along a normal of a disk surface (recording surface) to be read and recorded, arranged are subsequently an objective lens 20, a wedge-type beam splitter or wedge-type prism 21 and a parallel plane plate beam splitter 22 in this order from the surface. The objective lens 20 is just opposite to the disk recording surface. On the other hand, both of the wedge-type beam splitter 21 and the plane-parallel plate beam splitter 22 have main surfaces which are inclined to this normal. The laser diodes 11, 12 for the DVD and CD and the wedge-type and plane-parallel plate beam splitters 21, 22 are positioned so that the light emitted from the laser diode 11 may be incident onto the surface facing to the disk of the wedge-type beam splitter 21 at a predetermined angle and this incident light may be reflected by the beam splitter 21 so as to be guided to the disk recording surface through the objective lens 20. They are also positioned so that the light emitted from the laser diode 12 may be incident onto the surface facing to the disk of the plane-parallel plate beam splitter 22 at a predetermined angle and this incident light may be reflected by the beam splitter 22 so as to be guided to the disk recording surface through the wedge-type beam splitter 21 and the objective lens 20.

The light beam converged by the objective lens 20 is optically modulated and reflected at the disk recording surface. The reflected light beam reaches the objective lens 20 as a returning light. The returning light, which has passed through the objective lens 20, is again guided to the wedge-type beam splitter 21 along the same optical path as the path of the incident light onto the disk. The wedge-type beam splitter 21 transmits this returning light, thereby guiding the returning light to the plane-parallel plate beam splitter 22. The plane-parallel plate beam splitter 22 also transmits the returning light from the wedge-type beam splitter 21, thereby guiding the returning light to a light receiving element or photoelectronic transducer element 30.

This embodiment has such a main feature that the wedge-type beam splitter 21 produces the stigmatic transmitted light while the plane-parallel plate beam splitter 22 produces the transmitted light with an astigmatic aberration. More specifically, the wedge-type beam splitter 21 is shaped so that it may transmit the focused light without producing an aberration. As means for causing astigmatic difference to the returned light in order to detect a focus error of light spot on the disk recording surface, employed is also the plane-parallel plate beam splitter 22 which can transmit therethrough the converged light while substantially producing therein the astigmatic aberration.

The light beam emitted from the first laser diode 11 is reflected by the wedge-type beam splitter 21. The reflected light beam is then guided to the objective lens 20 and the disk recording surface in a stigmatic state. The returned light from the disk also passes through the wedge-type beam splitter 21 with little aberration toward the plane-parallel plate beam splitter 22. When the returning light is incident on the plane-parallel plate beam splitter 22, the astigmatic difference for detecting the focus error is given to the returned light. This allows the light receiving element 30 to receive the returning light of a magnitude according to an amount of aberration, thereby to produce an output giving the focus error.

The light beam emitted from the second laser diode 12 is processed in the same manner as mentioned above. This light beam is reflected by the plane-parallel plate beam splitter 22. The reflected light beam is incident onto the wedge-type beam splitter 21 in the stigmatic state. At this time, the incident light also passes through the wedge-type beam splitter 21 in the stigmatic state. Therefore, the light beam from the second laser diode 12 is also guided to the objective lens 20 and the disk recording surface in the stigmatic state. In this case, the returned light from the disk is also given little aberration by the wedge-type beam splitter 21 and transmits to the plane-parallel plate beam splitter 22. The returned light impinges on the light receiving element 30 with the astigmatic difference caused by the plane-parallel plate beam splitter.

Next, the wedge-type beam splitter 21 will be described which allows the returned light from the disk to pass through toward the plane-parallel plate beam splitter 22 in the stigmatic state and allows the light beam from the second laser diode 12 to pass through the objective lens 20 in the stigmatic state.

Figure 3:
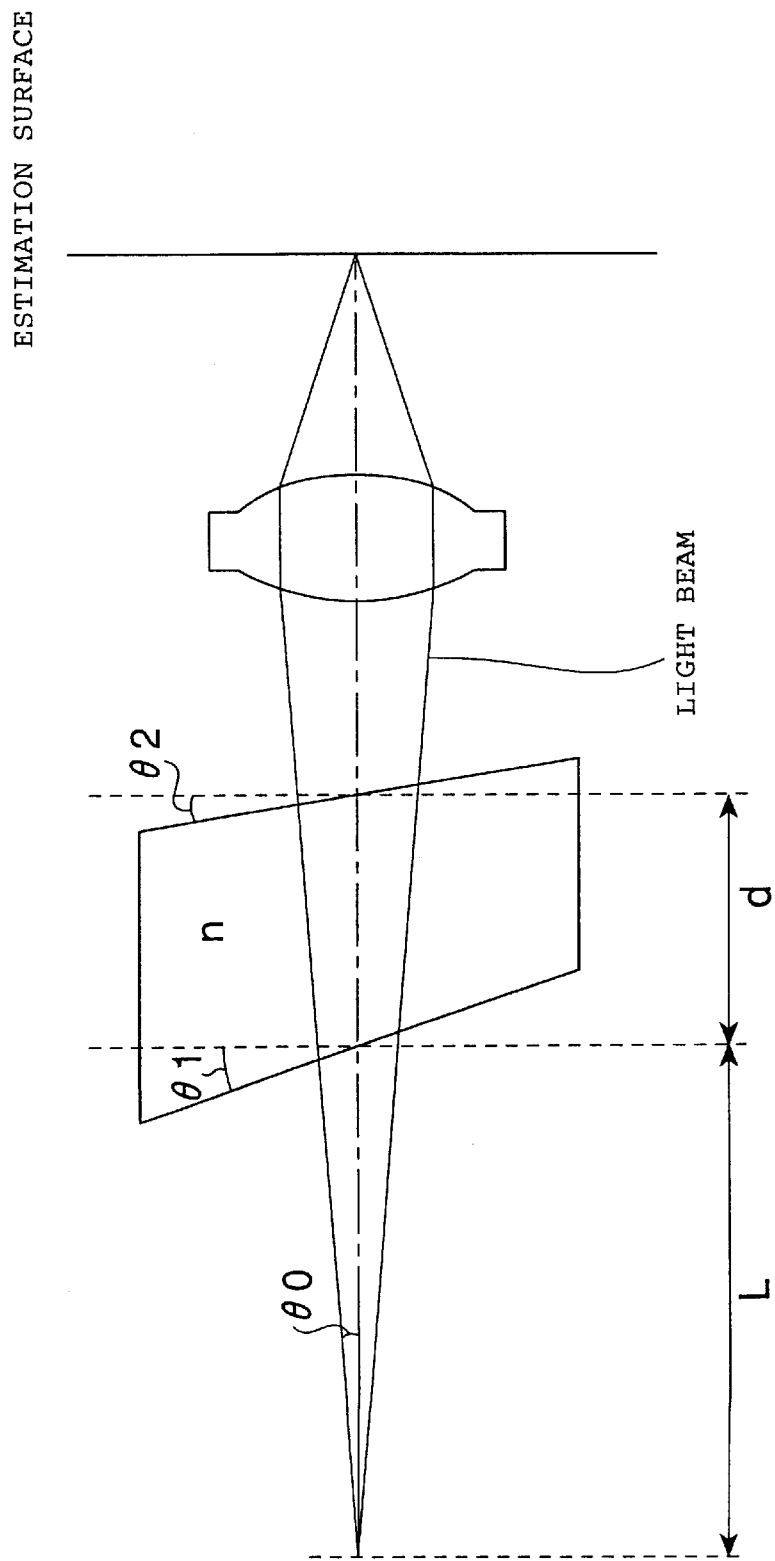
FIG. 3 typically shows parameters for determining a shape of a wedge-type beam splitter for use in the optical head device shown in FIG. 2.

FIG. 3 shows parameters for determining a shape and optical characteristics of the wedge-type beam splitter 21 together with a model of the shape. The wedge-type beam splitter 21 is basically determined by a refractive index n, a thickness d, an inclination angle $\theta1$ of the surface facing to a light source with respect to the surface perpendicular to an optical axis, an inclination angle $\theta2$ of the surface facing to the objective lens with respect to the surface perpendicular to the optical axis, an angle $\theta0$ of emission of the light beam from the light source and a distance L between the light source and the position of the surface on the optical axis at which the light beam is incident.

Figure 4:
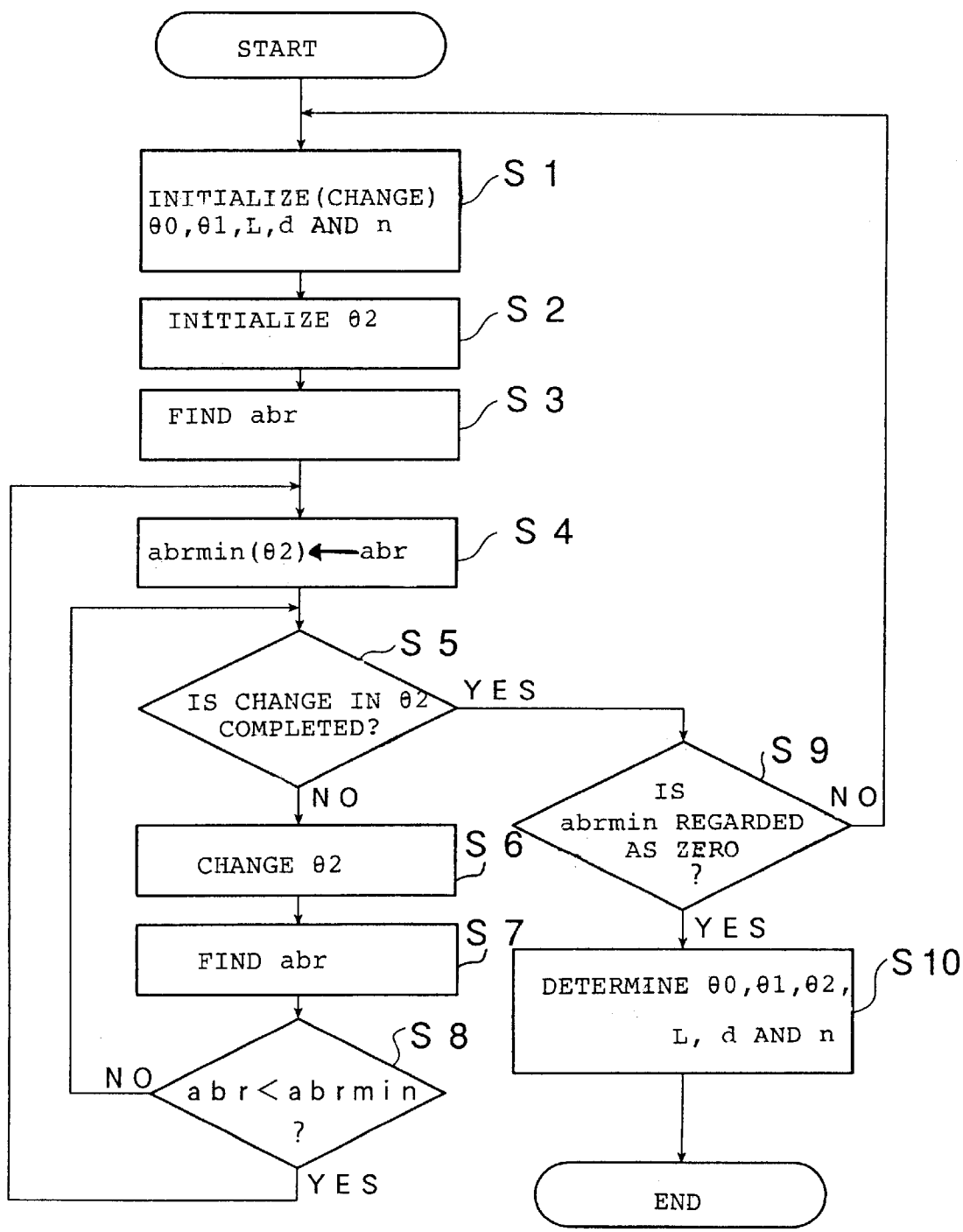
FIG. 4 is a flow chart showing an method for determining the shape of the wedge-type beam splitter to obtain a stigmatic transmitted light in accordance with the parameters shown in FIG. 3.

FIG. 4 is a flow chart showing an method for determining the shape of the wedge-type beam splitter in accordance with these parameters.

In the first place, respective initial values of $\theta0$, $\theta1$, n, d and L are set in the above parameters (step S1). $\theta2$ is set to the initial value (step S2). These initial values are based on a pickup optical system which is actually used. When the initial value of θ2 is set to be the same value as θ1, it is easy to treat the value θ2. This is because the following parameter can be readily modified from a state where the wedge-type beam splitter 21 is a plane-parallel plate in shape.

Next, determined is the amount of aberration abr of the light beam on an estimation surface (see FIG. 3) which is obtained in accordance with the parameters whose values are set (step S3). This value is temporarily held as the minimum value of aberration abrmin in accordance with the value θ2 at that time (step S4). After the step S4, it is determined whether or not the change in the value θ2 is completed (step S5). This step is for determining whether or not all the values θ2 are changed over the preset region (for example, within the range of ±90° with respect to the initial value of θ2) in the following step S6. When the value θ2 may be changed, a processing proceeds to the step S6, thereby changing the value θ2 by a predetermined amount of change.

When the value θ2 is changed in the step S6, the amount of aberration abr is determined in the same manner as the case of the step S3 in accordance with this new value θ2 (step S7). When the new amount of aberration abr is determined in the manner described above, this is compared to the previous value abrmin (step S8). When abr<abrmin is satisfied, the processing proceeds to the step S4. The determined value abr is defined as the value abrmin and then is held in accordance with the value θ2 at that time. The processing is repeated again from the step S5. If the obtained value abr is less than the value abrmin whenever the value θ2 is changed, the processing is repeated from the steps S4 to S8. Whenever the processing is repeated, the value abrmin (θ2) is updated.

When the value is determined as abr≧abrmin in the step S8, that is, the newly obtained value abr is equal to or more than the value abr which is previously held, the value abrmin is not updated. The processing proceeds to the step S5 so as to evaluate the value abr of the value θ2 to be subsequently changed.

When the completion of all the changes in the value θ2 is determined in the step S5, it is determined if the finally obtained value abrmin is considered to be zero, that is, stigmatic (in other words, the value abrmin is negligible) (step S9). If so, the value θ2 corresponding to the value abrmin and the values θ0, θ1, n, d and L lastly set are determined as the parameters for determining the shape and optical characteristics of the wedge-type beam splitter (step S10). The processing is completed.

When, on the other hand, the value abrmin cannot be regarded as zero in the step S9, the processing returns to the step S1. At least one of the values θ0, θ1, n, d and L is changed, and then the steps from the step S2 are performed. In the step S1 performed in such a flow, priority can be given to the parameters to be changed in values. For example, the priority is given to the values θ1, d and n which are the parameters of the wedge-type prism, that is, the wedge-type beam splitter 21 itself so that the values are changed. These values θ1, d and n are changed, and then the processing proceeds to the step S9. The values θ0 and L may be changed only when the fact is determined that the optimal value abrmin cannot be found.

By an approach as shown in FIG. 4, a specification of the wedge-type beam splitter which transmits the incident light in the stigmatic state can be determined.

Returning again to FIG. 2, optimization can be accomplished in the following manner in the optical characteristics of both main surfaces A, B of the wedge-type beam splitter 21 and of both main surfaces C, D of the plane-parallel plate beam splitter 22. Such an optimization is basically accomplished so that the returning light beams from the disk originated by the first and the second laser beams may have the maximum intensity on the light receiving element 30.

In the first place, a precondition of calculation is defined as described below. The light reflectance of the surface A shall be defined as RA (a light transmittance is therefore defined as 1−RA). The reflectance of the surface C shall be defined as RC (the light transmittance is therefore defined as 1−RC). Each reflectance of the surfaces B and D shall be defined as 0 (the light transmittance is therefore defined as 1). No light intensity shall be lost on the side of the disk.

The beam emitted from the laser diode 11 for the DVD takes the following path: the LD1→the surface A (by which the beam is reflected)→the disk recording surface (by which the beam is reflected)→the surface A (which transmits the beam)→the surface B (which transmits the beam)→the surface C (which transmits the beam)→the surface D (which transmits the beam)→the light receiving element 30. Therefore, a light intensity I1 is represented on the light receiving element 30 by the following equation (1).

$$I1=RA\times(1-RA)\times(1-RC) \quad (1)$$

On the other hand, the beam emitted from the laser diode 12 for the CD takes the following path: the LD2→the surface C (by which the beam is reflected)→the surface B (which transmits the beam)→the surface A (which transmits the beam)→the disk recording surface (by which the beam is reflected)→the surface A (which transmits the beam)→the surface B (which transmits the beam)→the surface C (which transmits the beam)→the surface D (which transmits the beam)→the light receiving element 30. Therefore, a light intensity I2 is represented on the light receiving element 30 by the following equation (2).

$$I2=RC\times(1-RA)\times(1-RA)\times(1-RC) \quad (2)$$

The light intensities are depicted on the basis of these equations (1) and (2) in FIGS. 5A and 5B.

FIG. 5A shows a distribution of the light intensity I1 relative to the emitted beam with an intensity of 1 where the reflectance RA is represented by the abscissa and the reflectance RC is represented by the ordinate. As seen from the graph shown in FIG. 5A, at an optimal estimate point p1, that is, where each reflectance is represented by RA=0.5, RC=0, the light intensity I1 is substantially maximum. In FIG. 5B, the abscissa and ordinate are also defined in the same manner. FIG. 5B shows the distribution of the light intensity I2 with respect to the emitted beam with the intensity of 1. As seen from the graph shown in FIG. 5B, at an optimal estimate point p2, that is, where each reflectance is represented by RA=0.5, RC=0, the light intensity I2 is substantially maximum.

Accordingly, as seen from the distributions of the light intensities I1 and I2, the optical characteristics are determined in the following manner so that the returning light from the disk may have the maximum intensity on the light receiving element 30. Specifically, the optical characteristics of the surface A are determined so that they may have the reflectance of 0.5 for the emitted beam from the laser diode 11 for the DVD and the reflectance of zero for the emitted beam from the laser diode 12 for the CD. Furthermore, the optical characteristics of the surface C are determined so that they may have the reflectance of zero for the emitted beam from the laser diode 11 for the DVD and the reflectance of 0.5 for the emitted beam from the laser diode 12 for the CD. These results are summarized in a table shown in FIG. 5C. Such light reflecting (transmission) properties of the surfaces A and C can be achieved by the formation of a multi-layered structure of an optical thin film or the like.

In the embodiment mentioned above, the light sources are disposed not only for the DVD but also for the CD and CD-R. It is therefore possible to provide the optical head device, which is capable of properly writing/reading information on the CD-R, and a CD/DVD compatible player using this optical head device. Moreover, in the embodiment, simply by forming the beam splitters corresponding to one of the light source to be a wedge type and a plane plate type, the stigmatic aberration required for each optical path position and the provision of aberration are achieved. Thus, the structure of the optical system is simplified. This contribute to the miniaturization of the optical head or optical pickup device.

As a variation of the embodiment, there is an example which uses three or more light sources. In this variation, the similar one to the combination of the light source 11 and the wedge-type beam splitter 21 may be also disposed between the objective lens 20 and the plane-parallel plate beam splitter 22 as needed. As is the case with the previously discussed embodiment, the wedge-type beam splitter allows the transmitted light to be stigmatic, while guiding the returned light from the disk to the plane-parallel plate beam splitter 22. The same effect can be achieved as is the case with the structure shown in FIG. 2.

For simplify the description, the embodiment is exemplified above, in which the emitted light from the laser diode 12 for the CD is incident directly onto the plane-parallel plate beam splitter 22. More practically, the emitted light is incident on the beam splitter 22 through an aperture stop 23 as shown by a broken line in FIG. 2. In the aperture stop 23, formed is, for example, an approximately circular hole which allows a predetermined luminous flux alone to pass through the center thereof. When the CD and CD-R are read/written, a beam diameter of the emitted light from the laser diode 12 is reduced. Consequently, a nominal NA of the objective lens 20 is reduced, and thus the diameter of beam spot to be emitted on the disk recording surface is increased. Thus, it is possible to create a light emission state most suitable for the CD and CD-R (and other so-called CD family) having a basically larger pit or recording mark. On the other hand, for the emitted light from the laser diode 11 for the DVD, the objective lens 20 itself typically has the NA which is set so that it may be suitable for that emitted light. Therefore, the emitted light is guided to the disk without changing the NA. In addition to this aperture stop, various approaches such as the use of the above-described hologram may be applicable and appropriately selected for an NA that is suitable for a certain disk.

In the aforementioned embodiment, the optical head device for reading/writing the DVD, the CD and the CD-R is described. However, the present invention is not limited to this type of disk, but is applicable to other types. For example, the present invention may be also applied to the optical pickup device in the CD/DVD compatible player which does not read/write the CD-R. In this case, since the device uses the light source of 780 nm most inherently suitable for reading the CD, it is more advantageous than the aforementioned prior-art device which reads the CD with a light source of 650 nm for use in the DVD. Accordingly, the present invention can be applied to various forms of disks, as long as the optical head or pickup device reads/writes the information by the use of at least two light sources.

In the above-described embodiment, the structure comprises a small number of optical components. Needless to say, additional optical components may be added to this structure in order to further improve a performance.

In the above description, the wedge-type beam splitter is applied as the first optical element, and the plane-parallel plate beam splitter is applied as the second optical element. The first optical element may be basically for reflecting one light beam from the light source so as to guide the reflected light to the objective lens and for transmitting the returned light beams in the stigmatic state therethrough. The second optical element may be merely for causing the astigmatic aberration to the returned light beams which passed through the first optical element and for transmitting that returned light beams therethrough. Furthermore, as means equivalent to the objective lens may be adopted another common light converging optical system which converges the supplied light beams toward the disk recording medium.

As described above in detail, according to the present invention, it is possible to excellently irradiate a plurality of independent light beams and receive the returned light beams with a simple structure.

The present invention is described above with reference to the preferred embodiment. It should be understood that various variations and changes can be readily apparent to those skilled in the art. All the variations and changes are included in the appended claims.

What is claimed is:

1. An optical pickup device comprising:

beam emitting means for supplying at least two independent light beams;

a common light converging optical system for converging the light beams from said beam emitting means toward a recording medium;

a first optical element for reflecting one of the light beams from said beam emitting means so as to guide the reflected light beam to said light converging optical system and for transmitting approximately stigmatic returning light beams from said recording medium therethrough without causing substantial aberration;

a second optical element for transmitting the returning light beams therethrough, the returning light beams having passed through said first optical element, while causing astigmatic aberration to the returning light beams; and light receiving means for receiving the returning light beams which have passed through said second optical element.

2. The optical pickup device according to claim 1, wherein said second optical element reflects the other light beam from said beam emitting means, thereby guiding the reflected light beam to said first optical element, and said first optical element transmits the approximately stigmatic light beam from said second optical element without causing substantial aberration, thereby guiding the light beam to said light converging optical system.

3. The optical pickup device according to claim 1, wherein said light converging optical system, said first optical element, said second optical element and said light receiving means are subsequently arranged in this order from a recording surface of said recording medium.

4. The optical pickup device according to claim 2, wherein said light converging optical system, said first optical element, said second optical element and said light receiving means are subsequently arranged in this order from a recording surface of said recording medium.

5. The optical pickup device according to claim 2, wherein said first and second optical elements have optical characteristics which are determined so that an intensity of light received by said light receiving means may be approximately maximum in each of the light beams from said beam emitting means.

6. The optical pickup device according to claim 5, wherein a reflectance of said first optical element is substantially 0% for a first light beam and approximately 50% for a second light beam, and a reflectance of said second optical element is approximately 50% for said first light beam and substantially 0% for said second light beam.

7. The optical pickup device according to claim 1, wherein said first optical element is a wedge-type beam splitter.

8. The optical pickup device according to claim 2, wherein said first optical element is a wedge-type beam splitter.

9. The optical pickup device according to claim 1, wherein said second optical element is a plane-parallel plate beam splitter.

10. The optical pickup device according to claim 2, wherein said second optical element is a plane-parallel plate beam splitter.

11. The optical pickup device according to claim 1, wherein an aperture stop is provided at least either between said beam emitting means and said first optical element or between said beam emitting means and said second optical element.

* * * * *